US011267470B2

(12) United States Patent
Bae et al.

(10) Patent No.: US 11,267,470 B2
(45) Date of Patent: Mar. 8, 2022

(54) VEHICLE TERMINAL AND OPERATION METHOD THEREOF

(71) Applicant: LG Electronics Inc., Seoul (KR)

(72) Inventors: Hyeonju Bae, Seoul (KR); Sangyol Yoon, Seoul (KR); Taekyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 16/552,427

(22) Filed: Aug. 27, 2019

(65) Prior Publication Data

US 2019/0382011 A1 Dec. 19, 2019

(30) Foreign Application Priority Data

Aug. 1, 2019 (KR) .................. 10-2019-0093815

(51) Int. Cl.
*B60W 30/16* (2020.01)
*B60W 30/095* (2012.01)
*B60W 40/068* (2012.01)
*B60W 30/18* (2012.01)
*B60W 50/14* (2020.01)
*G06K 9/00* (2006.01)

(52) U.S. Cl.
CPC ........ *B60W 30/162* (2013.01); *B60W 30/095* (2013.01); *B60W 30/18163* (2013.01); *B60W 40/068* (2013.01); *B60W 50/14* (2013.01); *G06K 9/00825* (2013.01); *B60W 2050/146* (2013.01); *B60W 2400/00* (2013.01); *B60W 2552/40* (2020.02); *B60W 2554/80* (2020.02); *B60W 2720/106* (2013.01); *B60W 2754/30* (2020.02); *B60W 2756/10* (2020.02)

(58) Field of Classification Search
CPC ....... B60W 2552/40; B60W 2050/143; B60W 2400/00; B60W 2720/106; B60W 30/162; B60W 30/095; B60W 50/14; B60W 50/03; B60W 50/18163; G06K 9/00825
USPC ......................................................... 701/96
See application file for complete search history.

(56) References Cited

U.S. PATENT DOCUMENTS

| | | | |
|---|---|---|---|
| 8,600,609 B2 | 12/2013 | Holzmann et al. | |
| 2005/0033517 A1* | 2/2005 | Kondoh | G05G 5/03 701/301 |
| 2014/0309864 A1* | 10/2014 | Ricci | G01C 21/365 701/36 |
| 2016/0231746 A1* | 8/2016 | Hazelton | G01S 13/867 |
| 2017/0305349 A1* | 10/2017 | Naboulsi | B60R 1/025 |
| 2018/0259956 A1* | 9/2018 | Kawamoto | B60W 40/09 |
| 2018/0284774 A1* | 10/2018 | Kawamoto | B60W 50/10 |
| 2019/0206260 A1* | 7/2019 | Pilkington | B60Q 1/44 |

(Continued)

FOREIGN PATENT DOCUMENTS

WO WO2017008801 1/2017

*Primary Examiner* — Yazan A Soofi
(74) *Attorney, Agent, or Firm* — Fish & Richardson P.C.

(57) ABSTRACT

Disclosed are a method for recognizing braking performance of a preceding vehicle and controlling driving of a vehicle based on the recognized braking performance, and a vehicle terminal therefor. One or more of a vehicle, a vehicle terminal, and an autonomous vehicle in the present disclosure may work in conjunction with an Artificial Intelligence (AI) module, an Unmanned Aerial Vehicle (UAV), a robot, an Augmented Reality (AR) device, a Virtual Reality (VR) device, a 5G service-related device, etc.

18 Claims, 6 Drawing Sheets

(56) References Cited

U.S. PATENT DOCUMENTS

2019/0333381 A1* 10/2019 Shalev-Shwartz ... G08G 1/0968
2019/0382012 A1* 12/2019 Lee ..................... H04L 67/125
2020/0004267 A1* 1/2020 Huang ................ G05D 1/0223

* cited by examiner

VEHICLE TERMINAL AND OPERATION METHOD THEREOF

CROSS-REFERENCE TO RELATED APPLICATION

This application is based on and claims priority under 35 U.S.C. § 119(a) to Korean Patent Application No. 10-2019-0093815, which was filed on Aug. 1, 2019, in the Korean Intellectual Property Office, the disclosure of which is incorporated herein in its entirety by reference.

BACKGROUND

1. Field

The present disclosure relates to a vehicle terminal and an operation method thereof. More particularly, the present disclosure relates to a vehicle terminal for recognizing braking performance of a preceding vehicle and controlling driving of a vehicle.

2. Description of the Related Art

As interest in Advanced Driver Assistance Systems (ADASs) such as an Adaptive Cruise Control (ACC) system for maintaining a safe distance from a vehicle ahead is recently increasing, it is necessary to more effectively provide the up-to-date ADASs In addition, a self-driving vehicle refers to a vehicle equipped with an autonomous driving apparatus capable of recognizing a surrounding environment of the vehicle and a vehicle state to thereby controlling driving of the vehicle. Along with researches on the self-driving vehicle, researches on various services for improving user convenience with the self-driving vehicle are being conducted as well.

SUMMARY

Embodiments disclosed herein show a vehicle terminal and an operation method thereof. A technical object is not limited to the aforementioned technical object and other technical objects may be inferred from embodiments described in the following.

In one general aspect of the present disclosure, there is provided an operation method of a terminal included in a vehicle, the method including: acquiring information on a turn-on state of a brake lamp of a preceding vehicle and information on a driving state of the preceding vehicle; recognizing braking performance of the preceding vehicle based on the acquired information; and controlling driving of the vehicle based on the recognized braking performance of the preceding vehicle.

In another general aspect of the present disclosure, there is provided a terminal included in a vehicle, the terminal including: an interface configured to acquire information on a turn-on state of a brake lamp of a preceding vehicle and information on a driving state of the preceding vehicle; and a controller configured to recognize braking performance of the preceding vehicle based on the acquired information, and controlling driving of the vehicle based on the recognized braking performance of the preceding vehicle.

In yet another general aspect of the present disclosure, there is provided an autonomous vehicle including: a driving device; and a terminal configured to control the driving device, wherein the terminal is configured to: acquire information on a turn-on state of a brake lamp of a preceding vehicle and information on a driving state of the preceding vehicle; and recognize braking performance of the preceding vehicle based on the acquired information, and controlling driving of the vehicle based on the recognized braking performance of the preceding vehicle.

In yet another general aspect of the present disclosure, there is provided a computer readable non-volatile recording medium in which a program for implementing the aforementioned method is recorded.

Details of other embodiments are included in the detailed description and the accompanying drawings.

According to the present disclosure, as a terminal included in a vehicle is able to recognize braking performance of a preceding vehicle based on information on a turn-on state of a brake lamp of the preceding vehicle and the like and to control driving of a vehicle by adaptively responding to the braking performance of the preceding vehicle, it is possible to control driving of the vehicle more effectively. In particular, the terminal is able to realize an Adaptive Cruise Control (ACC) system which can be set differently according to the braking performance of the preceding vehicle, and thus it is possible to control driving of the vehicle system more effectively through the ACC. In addition, as an autonomous vehicle heavily depends on the ACC system when driving autonomously, more effective self-driving may be possible.

However, the effects of the invention are not limited to the above-mentioned effects, and effects other than the above-mentioned effects can be clearly understood by those of ordinary skill in the art from the following descriptions.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AL)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, embodiments of the present disclosure will be described in detail with reference to the drawings.

Figure 1:
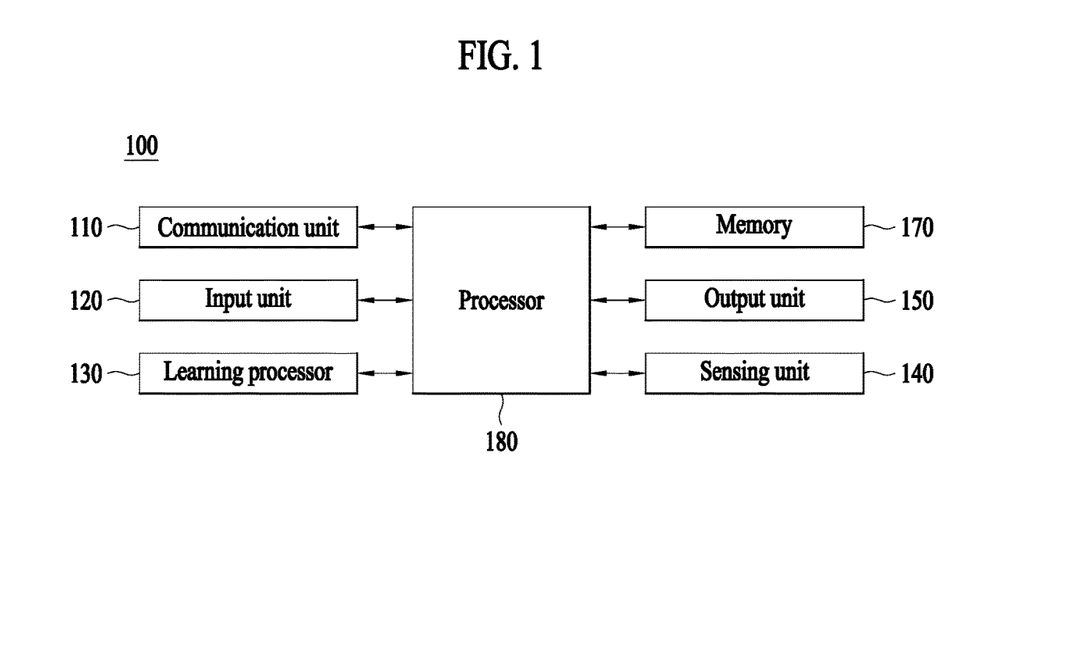
FIG. 1 shows an Artificial Intelligence (AI) device according to an embodiment of the present disclosure.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, Terminal 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
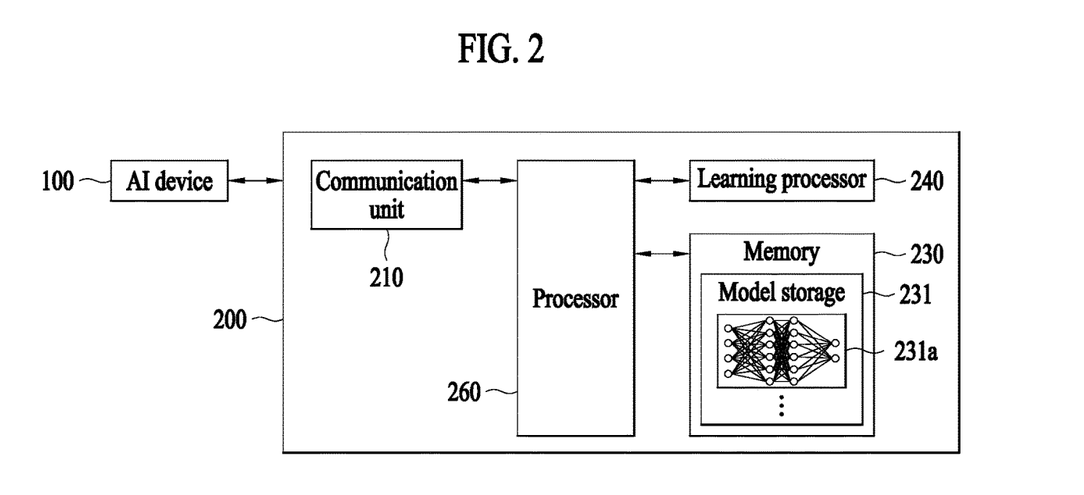
FIG. 2 shows an AI server according to an embodiment of the present disclosure.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
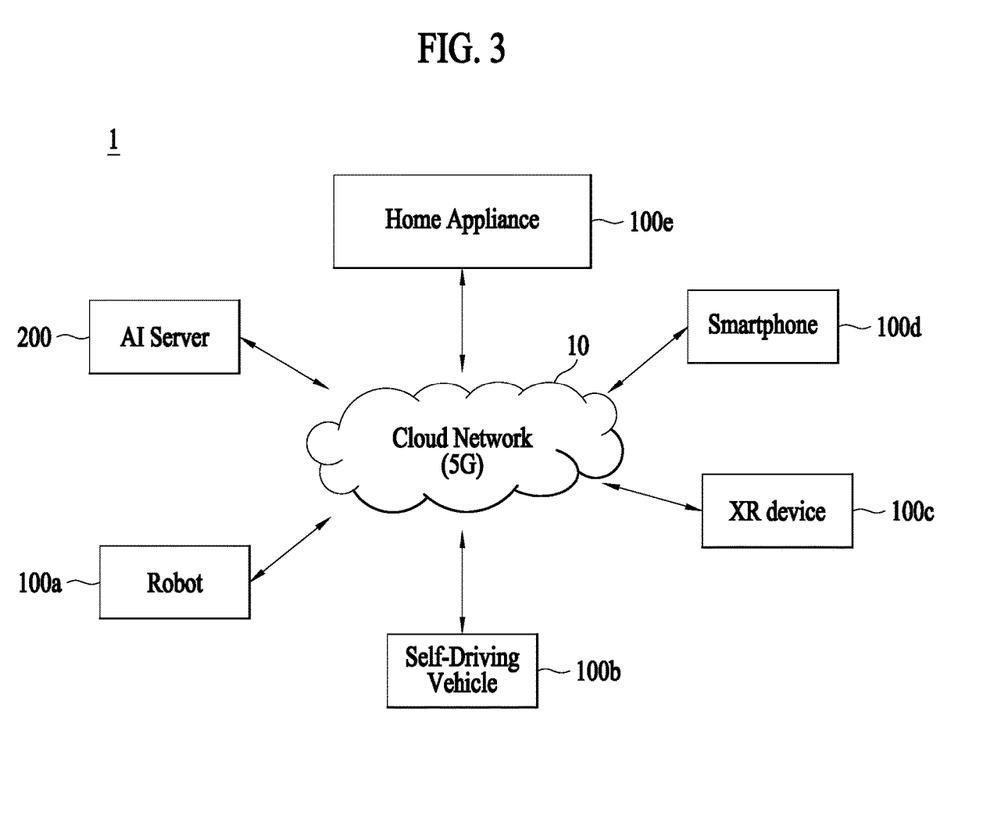
FIG. 3 shows an AI system according to an embodiment of the present disclosure.

FIG. 3 illustrates an AI system 1 according to an embodiment of the present disclosure.

Referring to FIG. 3, in AI system 1, at least one of AI server 200, a robot 100a, an autonomous driving vehicle 100b, an XR device 100c, a smart phone 100d, and a home appliance 100e is connected to a cloud network 10. Here, robot 100a, autonomous driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Autonomous driving vehicle 100b may be realized into a mobile robot, a vehicle, or an unmanned air vehicle, for example, through the application of AI technologies.

Autonomous driving vehicle 100b may include an autonomous driving control module for controlling an autonomous driving function, and the autonomous driving control module may mean a software module or a chip realized in hardware. The autonomous driving control module may be a constituent element included in autonomous driving vehicle 100b, but may be a separate hardware element outside autonomous driving vehicle 100b so as to be connected to autonomous driving vehicle 100b.

Autonomous driving vehicle 100b may acquire information on the state of autonomous driving vehicle 100b using sensor information acquired from various types of sensors, may detect (recognize) the surrounding environment and an object, may generate map data, may determine a movement route and a driving plan, or may determine an operation.

Here, autonomous driving vehicle 100b may use sensor information acquired from at least one sensor among a LIDAR, a radar, and a camera in the same manner as robot 100a in order to determine a movement route and a driving plan.

In particular, autonomous driving vehicle 100b may recognize the environment or an object with respect to an area outside the field of vision or an area located at a predetermined distance or more by receiving sensor information from external devices, or may directly receive recognized information from external devices.

Autonomous driving vehicle 100b may perform the above-described operations using a learning model configured with at least one artificial neural network. For example, autonomous driving vehicle 100b may recognize the surrounding environment and the object using the learning model, and may determine a driving line using the recognized surrounding environment information or object information. Here, the learning model may be directly learned in autonomous driving vehicle 100b, or may be learned in an external device such as AI server 200.

At this time, autonomous driving vehicle 100b may generate a result using the learning model to perform an operation, but may transmit sensor information to an external device such as AI server 200 and receive a result generated by the external device to perform an operation.

Autonomous driving vehicle 100b may determine a movement route and a driving plan using at least one of map data, object information detected from sensor information, and object information acquired from an external device, and a drive unit may be controlled to drive autonomous driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, autonomous driving vehicle 100b may perform an operation or may drive by controlling the drive unit based on user control or interaction. At this time, autonomous driving vehicle 100b may acquire interactional intention information depending on a user operation or voice expression, and may determine a response based on the acquired intention information to perform an operation.

Figure 4:
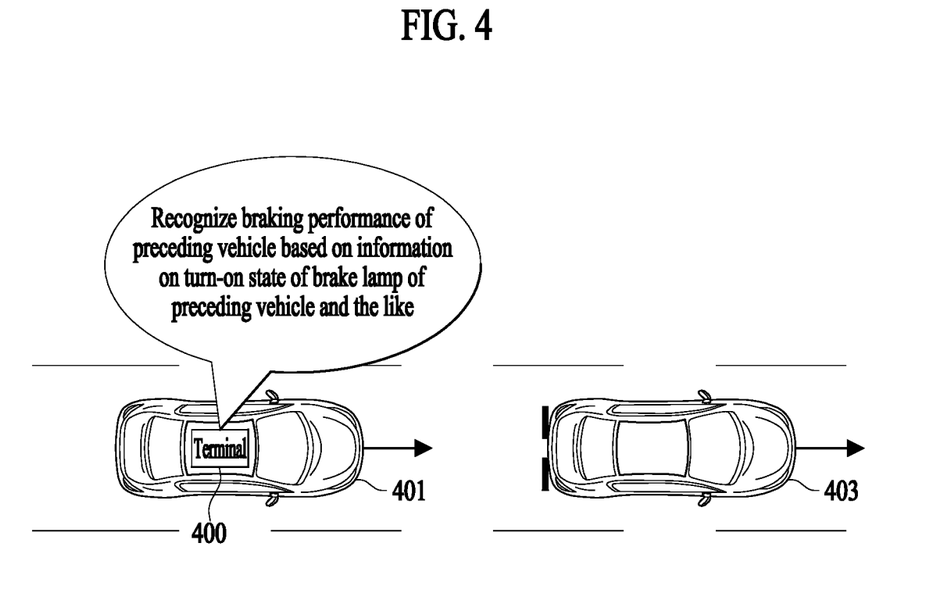
FIG. 4 shows an embodiment in which a terminal included in a vehicle operates.

FIG. 4 shows an embodiment in which a terminal included in a vehicle operates.

A terminal 400 may be included in a vehicle 401. An Adaptive Cruise Control (ACC) system may be installed in the vehicle 401. The ACC system is a kind of An Advanced Driver Assistance System (ADAS) and refers to a system to automatically control a driving speed so as to maintain a safe distance from a preceding vehicle. In addition, the ACC system may include an Autonomous Emergency Braking (AEB) system. That is, the ACC system may control emergency braking of the vehicle 401 through the AEB system.

The terminal 400 may recognize a turn-on state or a turn-off state of a brake lamp of a preceding vehicle 403 traveling ahead of the vehicle 401. The brake lamp may be disposed at rear of the vehicle and may be a tail lamp that turns on upon braking. In addition, the terminal 400 may recognize a driving state of the preceding vehicle 403, such as a driving speed and a driving position, The terminal 400 may recognize braking performance of the preceding vehicle 403 based on a turn-on state and a driving state of the preceding vehicle 403. Specifically, based on the turn-on state and the driving state of the preceding vehicle 403, the terminal 400 may determine a road friction coefficient for a road in which the preceding vehicle 403 is traveling. Based on the road friction coefficient, the terminal 400 may recognize braking performance of the preceding vehicle 403. For example, when the road friction coefficient is lower than a predetermined threshold value, the terminal 400 may recognize that braking performance of the preceding vehicle 403 is low.

The terminal 400 may control driving of the vehicle 401 based on the recognized braking performance of the preceding vehicle 403. In one example, the terminal 400 may control driving of the vehicle 401 by setting a parameter of the ACC system of the vehicle 401 based on the recognized braking performance of the preceding vehicle 403. For example, when braking performance of the preceding vehicle 403 is high, the terminal may set a time to collision (TTC), which is an operating parameter of the ACC system, to be higher than usual. In other words, in a case where braking performance of the preceding vehicle 403 is high, a braking distance of the preceding vehicle 403 is short and a collision possibility may be increased, and therefore, the terminal 400 may set a TTC to be higher than usual so that a safe distance longer than usual is ensured. In another embodiment, based on recognized braking performance of the preceding vehicle 403, the terminal 400 may control driving of the vehicle 401 so that the vehicle 401 changes a lane.

Accordingly, the terminal 400 may recognize braking performance of the preceding vehicle 403 through information regarding a turn-on state of a brake lamp of the preceding vehicle 403 and the like, and may control driving of the vehicle 401 by adaptively responding to the braking performance of the preceding vehicle 403. Therefore, driving of the vehicle 401 may be controlled more effectively. In particular, the terminal 400 is able to embody the ACC system that can be set differently according to braking performance of the preceding vehicle 403, and thus driving of the vehicle 401 may be controlled more effectively through the ACC system. In addition, as a self-driving vehicle heavily depends on the ACC system when driving autonomously, more effective self-driving may be possible.

Figure 5:
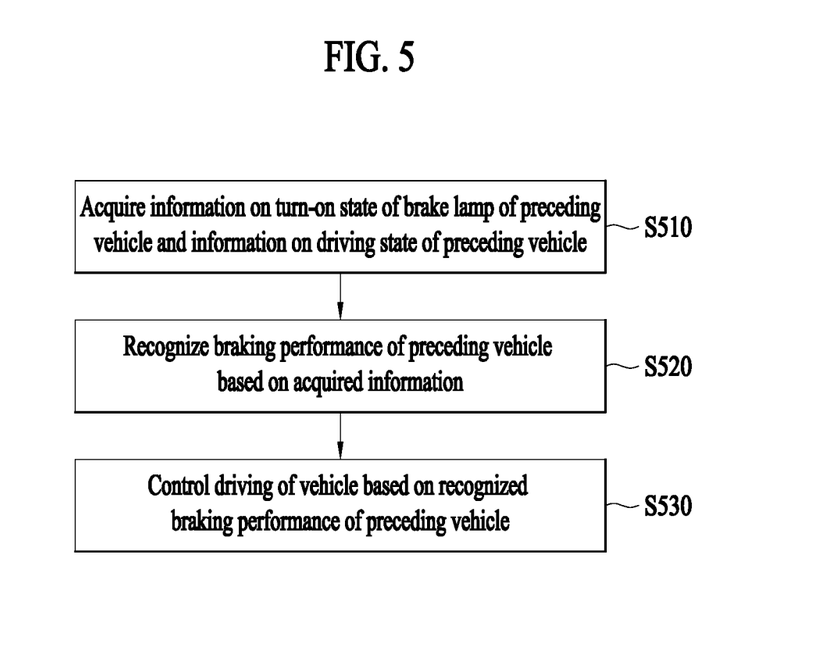
FIG. 5 shows an embodiment of an operation method of a terminal included in a vehicle.

FIG. 5 is an embodiment of an operation method of a terminal included in a vehicle.

The flowchart shown in FIG. 5 includes steps that are processed in time series by the terminal 400 shown in FIG. 4. Accordingly, details described regarding operations of the terminal 400 shown in FIG. 4 may apply to the flowchart shown in FIG. 5 even if omitted in the following.

In step S510, the terminal 400 may acquire information on a turn-on state of a brake lamp of a preceding vehicle and a driving state of the preceding vehicle. The terminal 400 may be included in a vehicle and may acquire information on a turn-on state of a brake lamp and a driving state of a preceding vehicle that is located ahead of the vehicle. In one example, the vehicle including the terminal 400 may be an autonomous vehicle.

In one example, the terminal 400 may acquire information on the turn-on state of the brake lamp and the driving state of the preceding vehicle through an image sensor of the vehicle. Specifically, the image sensor of the vehicle may sense an image of the brake lamp of the preceding vehicle, and the terminal 400 may recognize the turn-on state or a turn-off state of the brake lamp of the preceding vehicle based on a sensing result of the image sensor. In addition, a Lidar sensor of the vehicle may sense the driving state of the preceding vehicle, and the terminal 400 may acquire information on a position of the preceding vehicle, a speed of the preceding vehicle, a distance to the preceding vehicle, and the like through a sensing result of the sensor.

In another example, the terminal 400 may acquire information on the turn-on state of the brake lamp and the driving state of the preceding vehicle through a communication unit of the vehicle. Specifically, since the communication unit is capable of communicating with the preceding vehicle through Vehicle to Vehicle (V2V) wireless communication, the communication unit of the vehicle may receive the information on the turn-on state of the brake lamp and information on the driving state from the preceding vehicle. Therefore, the terminal 400 may acquire the turn-on state of the brake lamp of the preceding vehicle and the driving state of the preceding vehicle through the communication unit of the vehicle.

In step S520, the terminal 400 may recognize braking performance of the preceding vehicle based on the information acquired in the step S510. Specifically, the terminal 400 may determine a road friction coefficient for a road in which the preceding vehicle is traveling, based on the information acquired in the step S510, and may recognize braking performance of the preceding vehicle based on the determined road friction coefficient.

Based on the acquired information on the turn-on state of the brake lamp of the preceding vehicle and the acquired information on the driving state of the preceding vehicle, the terminal 400 may determine a road friction coefficient for a road in which the preceding vehicle is travelling. Here, the road friction coefficient represent a coefficient of friction between a tire of the preceding vehicle and a road surface and may be estimated based on the acquired information. Specifically, the terminal 400 may determine a road friction coefficient for a road in which the preceding vehicle is traveling, based on a speed of the preceding vehicle at a turn-on timing of the brake lamp, a speed of the preceding vehicle at a turn-off timing of the brake lamp, and a difference between a distance from the vehicle to the preceding vehicle at the turn-on timing and a distance from the vehicle to the preceding vehicle at the turn-off timing. For example, the terminal 400 may determine a road friction coefficient μ according to Equation 1 as below.

$$\mu = \frac{v_i^2 - v_f^2}{2\Delta D_d g} \qquad \text{[Equation 1]}$$

In Equation 1, $v_i$ denotes a speed of the preceding vehicle at the turn-on timing of the brake lamp, $v_f$ denotes a speed of the preceding vehicle at the turn-off timing of the brake lamp, $\Delta D_d$ denotes a difference between a distance from the vehicle to the preceding vehicle at the turn-on timing and a distance from the vehicle to the preceding vehicle at the turn-off timing, and g denotes gravitational acceleration.

The terminal 400 may recognize braking performance of the preceding vehicle through a pre-determined road friction coefficient. In other words, the terminal 400 may predict braking performance of the preceding vehicle through a pre-determined the road friction coefficient. For example, in a case where the pre-determined the road friction coefficient value indicates a general dry road surface, the terminal 400 may recognize braking performance of the preceding vehicle as a high level, and, in a case where the pre-determined the road friction coefficient indicates a wet road surface due to raining, the terminal 400 may recognize the pre-determined the road friction coefficient as a low level. For example, when the pre-determined the road friction coefficient falls within a range from 0.4 to 0.6, the terminal 400 may recognize that braking performance of the preceding vehicle is low, and, when the pre-determined the road friction coefficient falls within a range from 0.7 to 1.0, the terminal 400 may recognize that braking performance of the preceding vehicle is high.

The terminal 400 may provide information on recognized braking performance of the preceding vehicle. For example, the terminal 400 may display information on the recognized braking performance of the preceding vehicle through a display of the vehicle. In another example, the terminal 400 may transmit the information on the recognized braking performance of the preceding vehicle to the preceding vehicle. For example, when the recognized braking performance of the braking performance is lower than a predetermined reference level, the terminal 400 may transmit the recognized information on the braking performance to the preceding vehicle. The terminal 400 may transmit the recognized information on the braking performance to the preceding vehicle through V2V wireless communication.

In step S530, the terminal 400 may control driving of the vehicle based on the braking performance of the preceding vehicle, which is recognized in the step S520.

In an example, the terminal 400 may control driving of the vehicle by setting a parameter of the ACC system based on braking performance of the preceding vehicle. The parameter of the ACC system may be, but not limited to, a TTC or a road friction coefficient.

The terminal 400 may set a TTC for the ACC system based on recognized braking performance of the preceding vehicle. When the recognized braking performance of the preceding vehicle is low, the terminal 400 may set the TTC for the ACC system to be lower than usual. When the recognized braking performance of the preceding vehicle is at a high level, the terminal 400 may set the TTC for the ACC system to be higher than usual.

The terminal 400 may set a road friction coefficient for the ACC system based on received braking performance of the preceding vehicle. In an example, the terminal 400 may set the road friction coefficient for the ACC system to a road friction coefficient predetermined to recognize the braking performance of the preceding vehicle. In another example, when the recognized braking performance of the preceding vehicle is low, the terminal 400 may set the road friction coefficient for the ACC system to be lower than usual, and, when the recognized braking performance of the preceding vehicle is at a high level, the terminal 400 may set the road friction coefficient for the ACC system to be higher than usual.

Accordingly, the ACC system is able to control driving of the vehicle according to a set parameter, and thus, the terminal 400 may control driving of the vehicle by setting a parameter of the ACC system. For example, when the terminal 400 sets a TTC of the ACC system to be higher than usual, the vehicle may travel while keeping a safe distance to the preceding vehicle longer than usual.

In another example, the terminal 400 may perform a control operation based on rake performance of the preceding vehicle so that the vehicle changes a lane. In an example, when braking performance of the preceding vehicle is lower than a predetermined reference level, the vehicle 400 may perform a control operation so that the vehicle changes a lane. For instance, when a road friction coefficient predetermined to recognize braking performance of the preceding vehicle is lower than the predetermined reference level, the terminal 400 may perform a control operation so that the vehicle changes a lane. For another instance, the terminal 400 may set a parameter of the ACC system based on braking performance of the preceding vehicle, and, when the set parameter and the reference level are compared and it is determined that there is a possibility of collision between the vehicle and the preceding vehicle, the terminal 400 may perform a control operation so that the vehicle changes a lane. A more detailed embodiment will be hereinafter described with reference to FIG. 6.

In yet another example, the terminal 400 may perform a control operation based on braking performance of the preceding vehicle so that the vehicle decelerates. For example, when the braking performance of the preceding vehicle is lower than the predetermined reference level, the terminal 400 may perform a control operation so that the vehicle decelerates.

Figure 6:
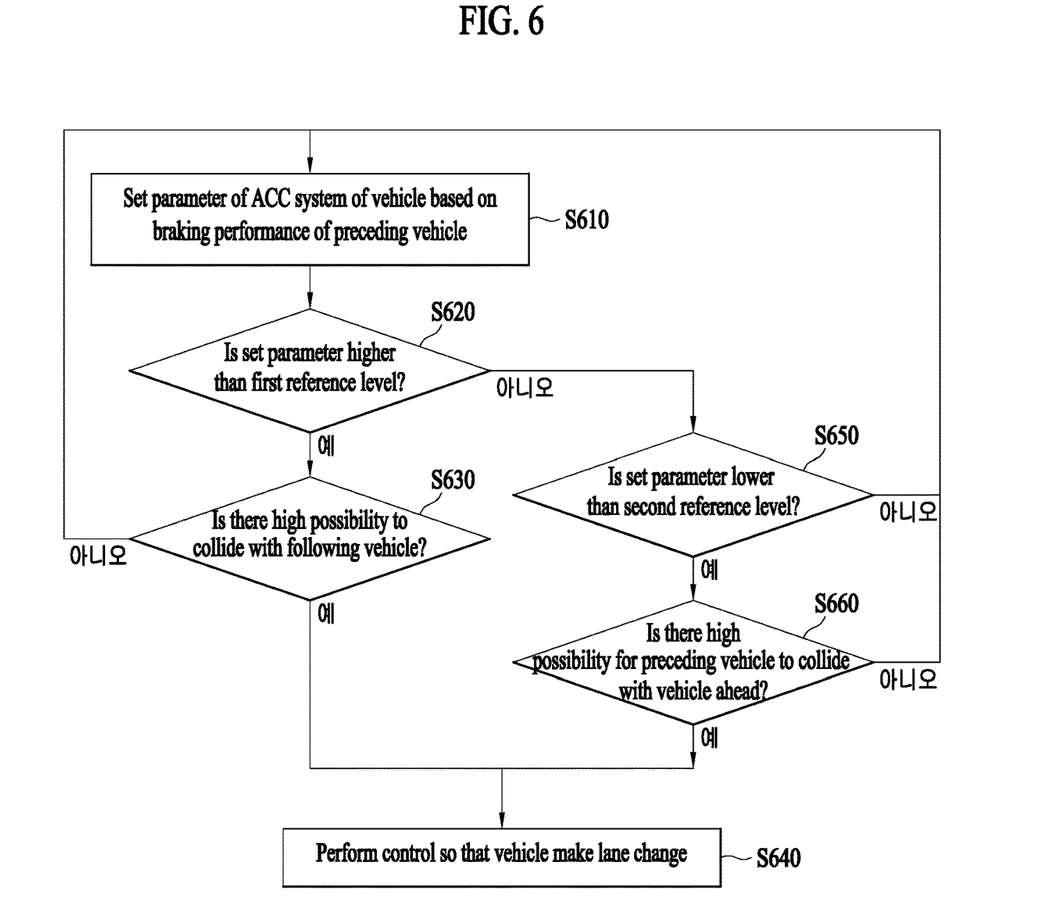
FIG. 6 shows a specific embodiment of an operation method of a terminal included in a vehicle.

FIG. 6 shows a specific embodiment of an operation method of a terminal included in a vehicle.

The flowchart shown in FIG. 6 includes steps that are processed in time series by the terminal 400 shown in FIG. 4. Accordingly, details described regarding operations of the terminal 400 shown in FIG. 4 may apply to the flowchart shown in FIG. 6 even if omitted in the following.

In step S610, the terminal 400 may set a parameter of the ACC system based on braking performance of a preceding vehicle traveling ahead of the vehicle. Specifically, the terminal 400 may set a TTC or a road friction coefficient of the ACC system based on the braking performance of the preceding vehicle.

In step S620, the terminal 400 may determine whether the parameter of the ACC system set in the step S610 is higher than a first reference level. In one example, the terminal 400 may determine whether a set TTC of the ACC system is higher than the first reference level. In another example, the terminal 400 may determine whether a set road friction coefficient is higher than the first reference.

In step S620, when it is determined that the preset parameter is higher than the first reference level, the terminal 400 may determine whether there is a high possibility for collision between the vehicle and a following vehicle in step S630. Specifically, when it is determined in the step S620 that a set parameter is higher than the first reference level, a long distance between the vehicle and the preceding vehicle may be set due to excellent braking performance of the preceding vehicle. Thus, the terminal 400 may determine whether there is a possibility for collision between the vehicle and the following vehicle, and, when a distance between the vehicle and the following vehicle is shorter than a predetermined reference level, the terminal 400 may determine that there is a high possibility for the vehicle to collide with the following vehicle. Thus, when it is determined in the step S630 that there is a high possibility for collision between the vehicle and the following vehicle, the terminal 400 may perform a control operation so that the vehicle makes a lane change to a next lane (S640). In this case, the terminal 400 may determine in advance whether there is a vehicle traveling on the next lane.

When it is determined in the step S620 that the preset parameter is not higher than the first reference level, the terminal 400 may determine whether the parameter of the ACC system set in the step S610 is lower than a second reference level (S650). For instance, the terminal 400 may determine whether a set TTC of the ACC system is lower than the second reference level. For another instance, the terminal 400 may determine a set road friction coefficient of the ACC system is lower than the second reference level.

When it is determined in the step S650 that a preset parameter is lower than the second reference level, the terminal 400 may determine whether there is a possibility for the preceding vehicle to collide with another vehicle ahead of the preceding vehicle (S660). Specifically, when it is determined in the step S620 that the preset parameter is lower than the second reference level, it means that braking performance of the preceding vehicle is low and thus a braking distance of the preceding vehicle may be long. Therefore, the terminal 400 may determine whether there is a possibility for the preceding vehicle to collide with the another vehicle ahead, and, when a distance between the preceding vehicle and the another vehicle ahead becomes shorter than a predetermined reference level, the terminal 400 may determine that there is a high possibility for the preceding vehicle to collide with the another vehicle ahead. Therefore, when it is determined in the step S660 that there is a high possibility for the preceding vehicle to collide with the another vehicle ahead, the terminal 400 may perform a control operation so that the vehicle makes a lane change to a next lane (S640). In this case, the terminal 400 may determine in advance whether there is a vehicle traveling on the next lane.

Figure 7:
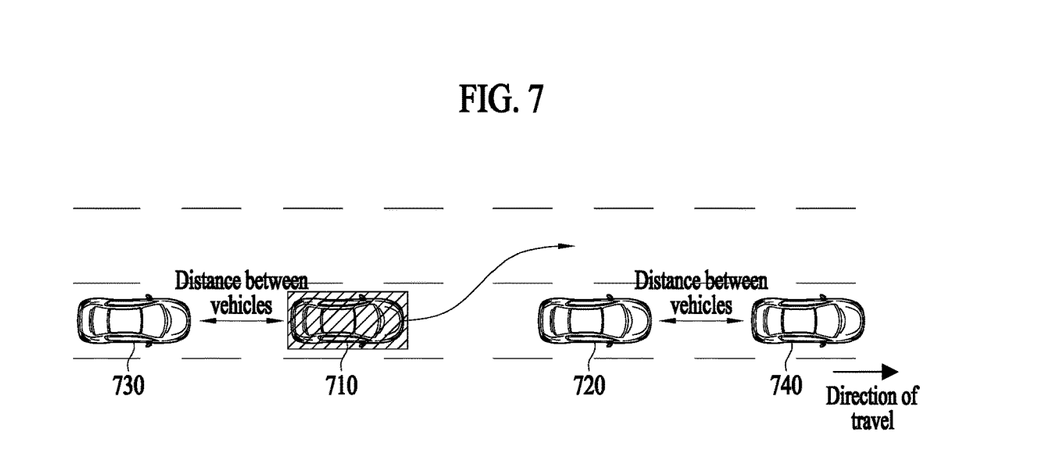
FIG. 7 shows a specific embodiment in which a vehicle makes a lane change.

FIG. 7 shows a specific embodiment in which a vehicle makes a lane change.

A vehicle 710 may recognize braking performance of a preceding vehicle 720 based on information on a turn-on state of a brake lamp of the preceding vehicle 720 and information on a driving state of the preceding vehicle 720. Then, the vehicle 710 may set a parameter of an ACC system of the vehicle 710 based on braking performance of the preceding vehicle 710. Specifically, the vehicle 710 may set a TTC or a road friction coefficient of the ACC system of the vehicle 710 based on the braking performance of the preceding vehicle 720.

When a set parameter of the ACC system is higher than a first reference level, the vehicle 710 may determine whether there is a high possibility for the vehicle 710 to collide with a following vehicle 720. Specifically, when a parameter of the ACC system is higher than the first reference level, a long distance between the vehicle 710 and the preceding vehicle 720 may be set due to excellent braking performance of the preceding vehicle 720. Therefore, when a distance between the vehicle 710 and the following vehicle 730 is shorter than a predetermined reference level, the vehicle 710 may determine that there is a high possibility for the vehicle 710 to collide with the following vehicle 730. In this case, the vehicle 710 may make a lane change.

When a set parameter of the ACC system is lower than a second reference level, the vehicle 710 may determine whether there is a high possibility for the preceding vehicle 720 to collide with another vehicle 740 ahead of the preceding vehicle 720. Specifically, when a parameter of the ACC system is lower than the second reference level, braking performance of the preceding vehicle 720 is low and thus a long braking distance of the preceding vehicle 720 may be long. Therefore, when a distance between the preceding vehicle 720 and the vehicle 740 is shorter than a predetermined reference level, the vehicle 710 may determine that there is a high possibility for the preceding vehicle 720 to collide with the another vehicle 740. In this case, the vehicle 710 may make a lane change.

Figure 8:
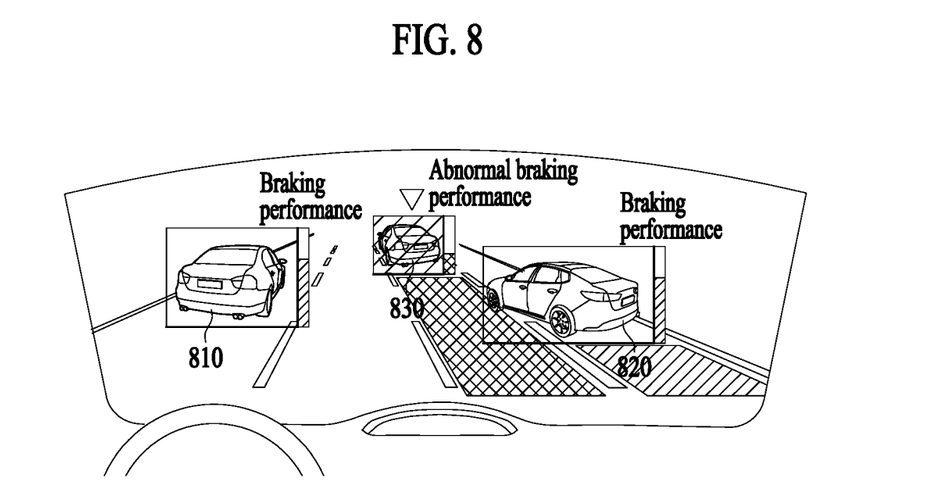
FIG. 8 shows an embodiment in which a terminal provides information on braking performance of a nearby vehicle.

FIG. 8 shows an embodiment in which a terminal provides information on braking performance of a nearby vehicle.

The terminal 400 may recognize braking performance of nearby vehicles 810, 820, and 830 based on information on a turn-on state of a brake lamp of each of the nearby vehicles 810, 820, and 830, and information on a driving state of each of the nearby vehicles 810, 820, and 830. Specifically, the terminal 400 may determine a road friction coefficient for each of the nearby vehicles 810, 820, and 830 based on the information on the turn-on state of the brake lamp and the information on the driving state, and may recognize braking performance of each of the nearby vehicles 810, 820, and 830 through the respective determined road friction coefficient.

Referring to FIG. 8, the terminal 400 may display the identified nearby vehicles 810, 820, and 830 through a display formed in a front windshield of the vehicle, and display the recognized braking performance of each of the nearby vehicles 810, 820, and 830. The terminal 400 may display braking performance of each of the nearby vehicles 810, 820, and 830 through a Head-Up Display (HUD). For instance, the terminal 400 may display the braking performance of each of the nearby vehicles 810, 820, and 830 in a bar form in a peripheral area of each of the nearby vehicles 810, 820, and 830 within the windshield. In addition, the terminal 400 may additionally display a caution for the nearby vehicle 830 of which braking performance is lower than a reference level. For example, 400 may display the nearby vehicle 830, of which braking performance is low, in different color.

When the nearby vehicle 830 ahead the vehicle is recognized as having low braking performance, the terminal 400 may perform a control operation so that the vehicle makes a lane change according to an avoidance driving mode.

The terminal 400 may display information on a road friction coefficient for a lane in surroundings of the vehicle. The terminal 400 may determine a road friction coefficient to recognize braking performance of a nearby vehicle and may display the determined road friction coefficient. For instance, the terminal 400 may display a road friction coefficient determined to recognized braking performance of the nearby vehicle 830 as a road friction coefficient of a lane in which the nearby vehicle 830 is traveling, and may display a road friction coefficient determined to recognized braking performance of the nearby vehicle 820 as a road friction coefficient of a lane in which the nearby vehicle 820 is traveling. Therefore, the terminal 400 may differentiate and display a lane on which the nearby vehicle 820 is traveling and a lane on which the nearby vehicle 830 is traveling, as shown in FIG. 8.

Figure 9:
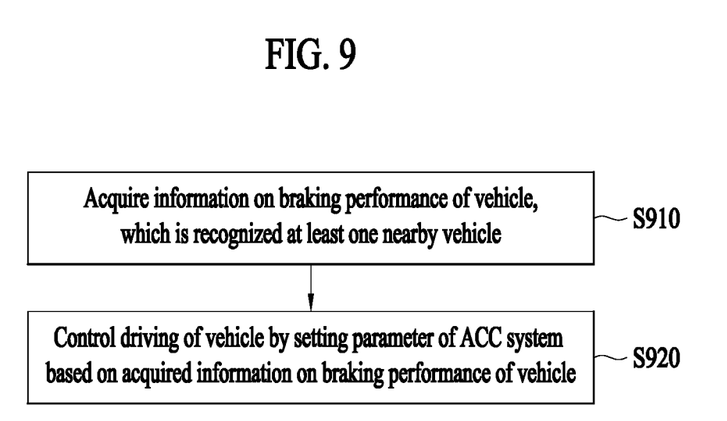
FIG. 9 shows another embodiment of an operation method of a terminal included in a vehicle.

FIG. 9 shows another embodiment of an operation method of a terminal included in a vehicle.

A flowchart shown in FIG. 9 includes steps that are processed in time series by the terminal 400 shown in FIG. 4. Accordingly, details described regarding operations of the terminal 400 shown in FIG. 4 may apply to the flowchart shown in FIG. 9 even if omitted in the following.

In step S910, the terminal 400 may acquire information on braking performance of the vehicle recognized by at least one nearby vehicle. In other words, the at least one nearby vehicle may recognize braking performance of the vehicle and may transmit the recognized braking performance of the vehicle to the terminal 400. Specifically, the at least one nearby vehicle may perform the step S520 of FIG. 5 to thereby determine a road friction coefficient of a road in which the vehicle is traveling, and may transmit the determined road friction coefficient as braking performance of the vehicle to the terminal 400.

In step S920, the terminal 400 may control driving of the vehicle by setting a parameter of the ACC system of the vehicle based on information on the braking performance acquired in the step S910.

The terminal 400 may set a TCC or a road friction coefficient of the ACC system based on braking performance of the vehicle, which is acquired from at least one nearby vehicle. For instance, the terminal 400 may set a road friction coefficient of the ACC system of the vehicle to a road friction coefficient that is predetermined by a nearby vehicle to recognize the braking performance of the vehicle.

Based on the braking performance of the vehicle acquired from the at least one nearby vehicle, the terminal 400 may more accurately determine a road friction coefficient of a road in which the vehicle is traveling. In other words, as the road friction coefficient acquired from the at least one nearby vehicle is an estimated road friction coefficient, the terminal 400 may determine a more accurate road friction coefficient based on the estimated road friction coefficient. For example, the terminal 400 may determine a road friction coefficient $\mu_r$ of a road in which the vehicle is traveling, according to Equation 2 as below.

$$\mu_b F_b r\theta + \mu_r mgD = mg\left(\frac{\mu_b F_b}{mg} + \mu_r\right)D = mg\mu D \quad \text{[Equation 2]}$$

$$\mu_r = \mu - \frac{\mu_b F_b}{mg}$$

In Equation 2, $\mu$ denotes a road friction coefficient estimated by a nearby vehicle, m denotes a weight of the vehicle, g denotes gravitational acceleration, $F_b$ denotes a force of friction on a braking pad of the vehicle, $r\theta$ denotes a braking distance on the braking pad, D denotes a braking distance on a tire of the vehicle, and it is assumed that $r\theta$ and D are identical. Therefore, as $\mu_b F_b$ and mg of the vehicle in Equation 2 are preset values, the terminal may acquire the road friction coefficient $\mu$ estimated by a nearby vehicle and thereby determine the road friction coefficient $\mu_r$.

Therefore, the terminal 400 may more precisely control driving of the vehicle by setting the more accurately determined road friction coefficient as a parameter of the ACC system.

Figure 10:
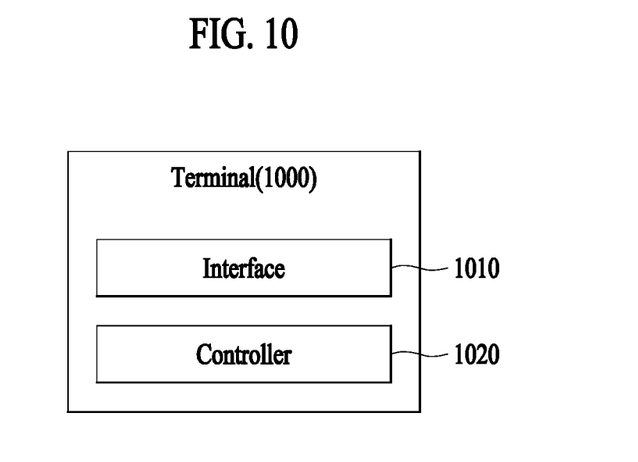
FIG. 10 shows a block diagram of a terminal included in a vehicle.

FIG. 10 shows a block diagram of a terminal included in a vehicle.

A terminal 1000 may be a device that is disposed inside a vehicle and assists driving of the vehicle. The terminal 1000 may include an interface 1010 and a controller 1020 according to an embodiment. The terminal 1000 shown in FIG. 10 includes only elements related to the present embodiment. Therefore, those of ordinary skill in the technical field related to the present embodiment will appreciate that general-use elements other than the elements shown in FIG. 10 may be further included.

The interface 1010 may acquire information on a turn-on state of a brake lamp of a preceding vehicle and information on a driving state of the preceding vehicle. The interface 1010 may acquire the information on the turn-on state of the brake lamp of a preceding vehicle through an image sensor of the vehicle, and may acquire the information on the driving state of the preceding vehicle through a Lidar sensor of the vehicle. The interface 1010 may acquire the information on the turn-on state of the brake lamp of the preceding vehicle through a communication unit of the vehicle. A communication techniques employed by the communication unit may include Global System for Mobile (GSM) communication, Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), etc.

The controller 1020 may control overall operations of the terminal 1000 and process data and signals. The controller 1020 may be configured as at least one hardware unit. In addition, the controller 1020 may operate by one or more software modules that is generated by executing a program code stored in a memory.

The controller 1020 may recognize braking performance of a preceding vehicle based on pre-acquired information. The controller 1020 may determine a road friction coefficient of a road in which the preceding vehicle is traveling, based on the pre-acquired information, and may recognize braking performance of the preceding vehicle through the determined road friction coefficient.

The controller 1020 may display information on the recognized braking performance of the preceding vehicle through a display. The controller 1020 may transmit the information on the recognized braking performance of the preceding vehicle through a communication unit of the vehicle to the preceding vehicle.

The controller 1020 may control driving of the vehicle based on pre-recognized braking performance of the preceding vehicle. The controller 1020 may control driving of the vehicle by setting a parameter of the ACC system based on braking performance of the preceding vehicle.

Based on the braking performance of the preceding vehicle, the controller 1020 may perform a control operation so that the vehicle makes a lane change. The controller 1020 may set a parameter of the ACC system of the vehicle based on the braking performance of the preceding vehicle, and, when the set parameter is compared with a reference level and thereby it is determined that there is a possibility of a collision of the vehicle or the preceding vehicle, the controller 1020 may perform a control operation so that the vehicle makes a lane change.

The controller 1020 may perform a control operation based on the braking performance so that the vehicle decelerates.

Figure 11:
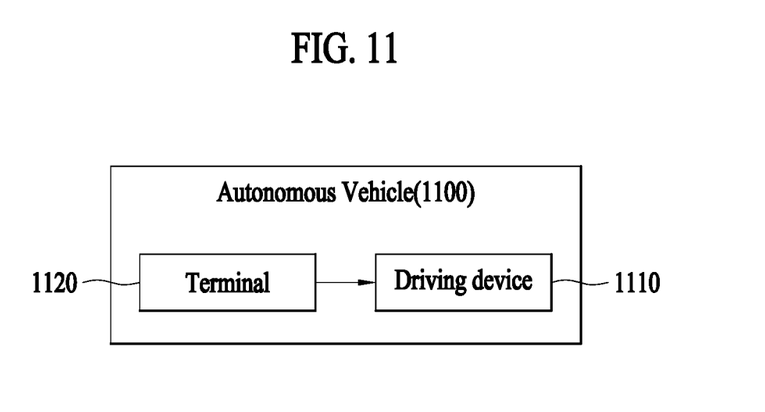
FIG. 11 shows a block diagram of an autonomous vehicle.

FIG. 11 shows a block diagram of an autonomous vehicle.

An autonomous vehicle 1100 may include a driving device 1110 and a terminal 1120. The autonomous vehicle 1100 shown in FIG. 11 includes only elements related to the present embodiment. Therefore, those of ordinary skill in the technical field related to the present embodiment will appreciate that general-use elements other than the elements shown in FIG. 11 may be further included.

The driving device 1110 may include constituent elements required to drive the autonomous vehicle 1100, such as a brake unit, a steering unit, and a throttle. The steering unit may be a combination of mechanisms configured to adjust a direction of travel of the autonomous vehicle. The throttle may be a combination of mechanisms configured to control a speed of the autonomous vehicle 1100 by controlling an operating speed of the engine/motor. Also, the throttle may adjust an amount of mixture gas of fuel air flowing into the engine/motor by adjusting an open amount of the throttle, and control power and propulsion by adjusting the open amount of the throttle. The brake unit may be a combination of mechanisms configured to decelerate the autonomous vehicle 1100. For example, the brake unit may use friction to reduce a speed of the wheel/tire.

As the autonomous vehicle 1100 is able to include an ACC system, the ACC system may control driving of the autonomous vehicle 1100 by controlling the driving device 1110. Specifically, the ACC system may control the driving device 1110 to ensure a safety distance from a preceding vehicle, thereby adjusting a speed of the autonomous vehicle 1100.

The terminal 1120 may acquire information on a turn-on state of a brake lamp of a preceding vehicle and information on a driving state of the preceding vehicle, recognize braking performance of the preceding vehicle based on the acquired information, and control the driving device 1110 based on the recognized braking performance of the preceding vehicle to thereby control traveling of the autonomous vehicle 1100. A description about the terminal 1000 shown in FIG. 10 may apply to the terminal 1120, and thus, a redundant description is omitted.

The device described above may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer readable recording medium include magnetic storage media (e.g., ROM, RAM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The present embodiment may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An operation method of a terminal included in a vehicle, the method comprising:
   acquiring information on a turn-on state of a brake lamp of a preceding vehicle and information on a driving state of the preceding vehicle;
   recognizing braking performance of the preceding vehicle based on the acquired information; and
   controlling driving of the vehicle based on the recognized braking performance of the preceding vehicle,
   wherein recognizing braking performance of the preceding vehicle based on the acquired information comprises:
      identifying a speed of the preceding vehicle at a turn-on timing of the brake lamp, a speed of the preceding vehicle at a turn-off timing of the brake lamp, a distance between the vehicle and the preceding vehicle at the turn-on timing, and a distance between the vehicle and the preceding vehicle at the turn-off timing based on the acquired information;
      determining a road friction coefficient for a road in which the preceding vehicle is traveling based on the speed of the preceding vehicle at the turn-on timing of the brake lamp, the speed of the preceding vehicle at the turn-off timing of the brake lamp, a difference between the distance between the vehicle and the preceding vehicle at the turn-on timing, and the distance between the vehicle and the preceding vehicle at the turn-off timing; and
      recognizing the braking performance of the preceding vehicle using the determined road friction coefficient.

2. The method of claim 1, wherein the controlling comprises controlling the driving of the vehicle by setting a parameter of an Adaptive Cruise Control (ACC) system of the vehicle based on the recognized braking performance.

3. The method of claim 2, wherein the controlling comprises setting at least one of a time to collision (TTC) or a road friction coefficient of the ACC system based on the recognized braking performance.

4. The method of claim 2, wherein the controlling comprises comparing the set parameter of the ACC system and a predetermined reference level, and controlling the driving of the vehicle so that the vehicle makes a lane change.

5. The method of claim 1, wherein the controlling comprises controlling the driving of the vehicle based on the recognized braking performance of the preceding vehicle so that the vehicle makes a lane change.

6. The method of claim 1, further comprising displaying information on the recognized braking performance of the preceding vehicle through a display.

7. The method of claim 1, further comprising transmitting information on the recognized braking performance of the preceding vehicle to the preceding vehicle through a Vehicle to Vehicle (V2V) wireless communication.

8. The method of claim 1, further comprising:
   acquiring information on braking performance of the vehicle, which is recognized by at least one nearby vehicle, from the at least one nearby vehicle; and
   controlling the driving of the vehicle by setting a parameter of an ACC system of the vehicle based on the acquired information on the braking performance of the vehicle.

9. A non-transitory computer-readable recording medium for storing a program, which when executed by one or more processors of a device, cause the device to perform:
acquiring information on a turn-on state of a brake lamp of a preceding vehicle and information on a driving state of the preceding vehicle;
recognizing braking performance of the preceding vehicle based on the acquired information; and
controlling driving of the vehicle based on the recognized braking performance of the preceding vehicle,
wherein recognizing braking performance of the preceding vehicle based on the acquired information comprises:
identifying a speed of the preceding vehicle at a turn-on timing of the brake lamp, a speed of the preceding vehicle at a turn-off timing of the brake lamp, a distance between the vehicle and the preceding vehicle at the turn-on timing, and a distance between the vehicle and the preceding vehicle at the turn-off timing based on the acquired information;
determining a road friction coefficient for a road in which the preceding vehicle is traveling based on the speed of the preceding vehicle at the turn-on timing of the brake lamp, the speed of the preceding vehicle at the turn-off timing of the brake lamp, a difference between the distance between the vehicle and the preceding vehicle at the turn-on timing, and the distance between the vehicle and the preceding vehicle at the turn-off timing; and
recognizing the braking performance of the preceding vehicle using the determined road friction coefficient.

10. A terminal included in a vehicle, the terminal comprising:
an interface configured to acquire information on a turn-on state of a brake lamp of a preceding vehicle and information on a driving state of the preceding vehicle; and
a controller configured to recognize braking performance of the preceding vehicle based on the acquired information, and control driving of the vehicle based on the recognized braking performance of the preceding vehicle,
wherein the controller is configured to:
identify a speed of the preceding vehicle at a turn-on timing of the brake lamp, a speed of the preceding vehicle at a turn-off timing of the brake lamp, a distance between the vehicle and the preceding vehicle at the turn-on timing, and a distance between the vehicle and the preceding vehicle at the turn-off timing based on the acquired information;
determine a road friction coefficient for a road in which the preceding vehicle is traveling based on the speed of the preceding vehicle at the turn-on timing of the brake lamp, the speed of the preceding vehicle at the turn-off timing of the brake lamp, a difference between the distance between the vehicle and the preceding vehicle at the turn-on timing, and the distance between the vehicle and the preceding vehicle at the turn-off timing; and
recognize the braking performance of the preceding vehicle using the determined road friction coefficient.

11. The terminal of claim 10, wherein the controller is configured to control the driving of the vehicle by setting a parameter of an Adaptive Cruise Control (ACC) system of the vehicle based on the recognized braking performance.

12. The terminal of claim 11, wherein the controller is configured to set at least one of a time to collision (TTC) or a road friction coefficient of the ACC system based on the recognized braking performance.

13. The terminal of claim 11, wherein the controller is configured to compare the set parameter of the ACC system and a predetermined reference level, and control the driving of the vehicle so that the vehicle makes a lane change.

14. The terminal of claim 10, wherein the controller is configured to control the driving of the vehicle based on the recognized braking performance of the preceding vehicle so that the vehicle makes a lane change.

15. The terminal of claim 10, wherein the controller is configured to display information on the recognized braking performance of the preceding vehicle through a display.

16. The terminal of claim 10, wherein the controller is configured to transmit information on the recognized braking performance of the preceding vehicle to the preceding vehicle through a Vehicle to Vehicle (V2V) wireless communication.

17. The terminal of claim 10, wherein the interface is configured to acquire information on braking performance of the vehicle, which is recognized by at least one nearby vehicle, from the at least one nearby vehicle, and
wherein the controller is configured to control the driving of the vehicle by setting a parameter of an ACC system of the vehicle based on the acquired information on the braking performance of the vehicle.

18. An autonomous vehicle, comprising:
a driving device; and
a terminal configured to control the driving device,
wherein the terminal is configured to:
acquire information on a turn-on state of a brake lamp of a preceding vehicle and information on a driving state of the preceding vehicle; and
recognize braking performance of the preceding vehicle based on the acquired information, and control driving of the vehicle based on the recognized braking
performance of the preceding vehicle,
wherein the terminal is configured to:
identify a speed of the preceding vehicle at a turn-on timing of the brake lamp, a speed of the preceding vehicle at a turn-off timing of the brake lamp, a distance between the vehicle and the preceding vehicle at the turn-on timing, and a distance between the vehicle and the preceding vehicle at the turn-off timing based on the acquired information;
determine a road friction coefficient for a road in which the preceding vehicle is traveling based on the speed of the preceding vehicle at the turn-on timing of the brake lamp, the speed of the preceding vehicle at the turn-off timing of the brake lamp, a difference between the distance between the vehicle and the preceding vehicle at the turn-on timing, and the distance between the vehicle and the preceding vehicle at the turn-off timing; and
recognize the braking performance of the preceding vehicle using the determined road friction coefficient.

* * * * *